United States Patent

Layland et al.

[11] 4,112,497
[45] Sep. 5, 1978

[54] DIGITAL DEMODULATOR-CORRELATOR

[76] Inventors: James C. Fletcher, Administrator of the National Aeronautics and Space administration, with respect to an invention of, James W. Layland; Warren L. Martin, both of La Canada; Arthur I. Zygielbaum, Arcadia; Richard M. Goldstein, La Canada; William P. Hubbard, Glendale, all of Calif.

[21] Appl. No.: 782,464

[22] Filed: Mar. 29, 1977

[51] Int. Cl.² .................. G06F 15/34; G01S 9/38
[52] U.S. Cl. .................. 364/728; 329/122; 343/14; 364/458; 364/604
[58] Field of Search .................. 328/133, 134; 329/50, 329/112, 122; 343/6.5 R, 12 R, 14; 364/456, 458, 459, 728, 604, 819

[56] References Cited

U.S. PATENT DOCUMENTS

| | | | |
|---|---|---|---|
| 3,659,292 | 4/1972 | Low et al. | 343/6.5 R |
| 3,689,750 | 9/1972 | Esser | 235/181 |
| 3,812,493 | 5/1974 | Afendykiw et al. | 343/12 R |
| 3,819,919 | 6/1974 | McGunigle | 235/181 |
| 3,955,197 | 5/1976 | Gutleber et al. | 343/100 CL |
| 3,956,623 | 5/1976 | Clark et al. | 328/133 |
| 4,025,775 | 5/1977 | Beauvais et al. | 235/181 |

*Primary Examiner*—Felix D. Gruber
*Attorney, Agent, or Firm*—Monte F. Mott; John R. Manning; Paul F. McCaul

[57] ABSTRACT

Apparatus for demodulation and correlation of a code modulated 10 MHz signal is comprised of a sample and hold analog-to-digital (A/D) converter synchronized by a frequency coherent 40 MHz pulse to obtain four evenly spaced samples A1,B1,A2 and B2 of each cycle of the signal, and means for adding, or subtracting, each sample to, or from, one of four accumulators to form the sums:

$$S1_I = \sum_t (A1 - A2) M1 \quad S1_Q = \sum_t (A1 - A2) M2$$

$$S2_I = \sum_t (B1 - B2) M1 \quad S2_Q = \sum_t (B1 - B2) M2$$

where
  M1 = 10 MHz Reference · Receiver Code $\angle 0°$
  M2 = 10 MHz Reference · Receiver Code $\angle 90°$ The correlation functions that are used for the range measurements are then computed from the following equations:

$$I = S1_I \cos \alpha - S2_I \sin \alpha$$

$$Q = S1_Q \cos \alpha - S2_Q \sin \alpha$$

where $\sin \alpha$ and $\cos \alpha$ are determined at the start of each range acquisition by forcing the receiver code for both M1 and M2 to be equal to 1 and applying these equations:

$$\sin \alpha = \frac{S1_I}{\sqrt{S1_I^2 + S2_I^2}}, \cos \alpha = \frac{S2_I}{\sqrt{S1_I^2 + S2_I^2}}.$$

12 Claims, 8 Drawing Figures

DIGITAL DEMODULATOR-CORRELATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; USC 2457).

BACKGROUND OF THE INVENTION

This invention relates to a method and apparatus for demodulation and correlation of a code modulated signal with respect to a reference signal.

The demodulation and correlation of a coded signal becomes very crucial in many systems, such as in ranging systems wherein range is essentially determined from the time required for electromagnetic waves to make a round trip between a transmitter-receiver and a turn-around transponder. Ranging systems are primarily useful in tracking spacecraft, but may also be useful in range tracking of aircraft from a ground station or another aircraft. In conjunction with simultaneous operation of three ground stations, enough accuracy may be achieved to implement an aircraft collision avoidance system. Since all of these systems are merely special applications of a ranging system, or are analogous to ranging systems in respect to demodulation and correlation of coded signals, the principles and preferred embodiment of the invention will be described with reference to a ranging system of the type described by Warren L. Martin and Richard M. Goldstein in U.S. Pat. No. 3,659,292.

SUMMARY OF THE INVENTION

Demodulation and correlation of a code modulated signal received with a reference code signal (receiver code) is accomplished with automatic operation and improved stability by sampling the received signal and converting each sample to digital form. Sampling is controlled by a frequency coherent signal that is stable at a frequency four times the signal to be demodulated and correlated such that four equally spaced samples A1, B1, A2 and B2 are obtained at the same phases of the signal during successive cycles. Each sample is added or subtracted to or from one of four accumulators to or from the separate sums.

$$S1_I = \sum_t (A1 - A2) M1 \qquad S1_Q = \sum_t (A1 - A2) M2$$

$$S2_I = \sum_t (B1 - B2) M1 \qquad S2_Q = \sum_t (B1 - B2) M2$$

where M1 is a reference signal at the frequency of the received signal multiplied by the receiver code, and M2 is the reference signal multiplied by the receiver code delayed ¼ cycle. The correlation functions are then computed according to the following equations:

$$I = S1_I \cos \alpha - S2_I \sin \alpha$$

$$Q = S1_Q \cos \alpha - S2_Q \sin \alpha$$

where $\sin \alpha$ and $\cos \alpha$ are determined in advance by forcing the receiver code in the products of M1 and M2 to be equal to 1, while forming sums in the accumulators, and computing $$\sin \alpha = \frac{S1_I}{\sqrt{S1_I^2 + S2_I^2}} = \frac{S1_Q}{\sqrt{S1_Q^2 + S2_Q^2}}$$

$$\cos \alpha = \frac{S2_I}{\sqrt{S1_I^2 + S2_I^2}} = \frac{S2_Q}{\sqrt{S1_Q^2 + S2_Q^2}}$$

As a further feature of the invention, the multipliers M1 and M2 are each multiplied by a squarewave chopper signal having a period that is long relative to the period of the received signal to foreclose contamination of the received signal by leakage from either of the other two terms of the multipliers.

DESCRIPTION OF PREFERRED EMBODIMENTS

Figure 1:
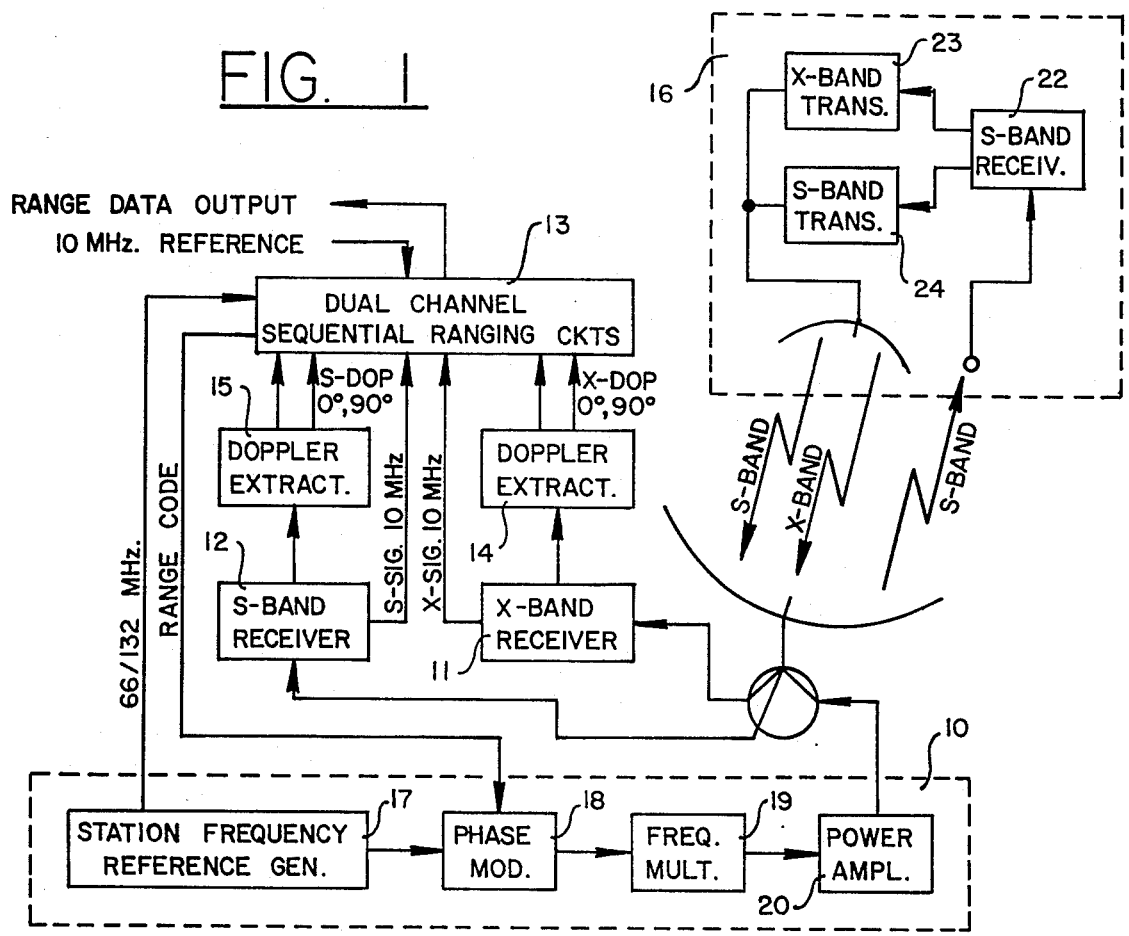
FIG. 1 is a functional block diagram of a spacecraft sequential ranging system which may employ the present invention to advantage.

Before describing a preferred embodiment, the theory or ranging will be described in order to better appreciate the improvement of the present invention over the basic binary coded sequential ranging system of the prior U.S. Pat. No. 3,659,292 (commonly referred to as the $\mu$-type system). Ranging is essentially a matter of determining the period of time an electromagnetic wave takes in traversing the round-trip distance from a base station to a transponder. Commonly called the round-trip-light time (RTLT), this period is measured through the use of a carrier modulated by some repetitious code, termed a range code. Transponded, the code is returned to the base station on a return carrier. The returned code appears phase delayed from that being transmitted due to the round-trip travel time. This phase delay is the basis for the range determination.

Phase delay translates directly into a measure of distance if the code's period is greater than the RTLT. This requirement presents no real problem for short distances as would be the case in such applications as surveying on earth or measuring the distance of aircraft, but for measuring the range of spacecraft, where the code period is some fraction of the RTLT, there is some difficulty because the range measurement is ambiguous. For example, if the transmitted and returned codes have periods of 1 second, and differ in phase by 180°, then the RTLT to the spacecraft could be 0.5, 1.5, 2.5 . . . (n+0.5) seconds (for any integer n). This ambiguity results due to repetition of the code during the RTLT to a spacecraft. RTLT's to spacecraft are typically on the order of tens of minutes for missions to neighboring planets, and hours for missions to more distant bodies such as Uranus. Unambiguous resolution of such distances would require codes of comparable periods. Both the generation and the phase measurement of such codes is impractical. Fortunately, it is possible to make an a priori estimate of the spacecraft's range which reduces the distance (phase delay) which must be resolved. The code period then need be only greater than the uncertainty of the a priori estimate since the number of code periods within the predicted distance can be computed. Adding the predicted number of code periods to the fractional period measured by the $\mu$-type system results in an unambiguous range determination.

Although measurement precision is conceptually quite distinct from ambiguity, it too is related to the code period. However, unlike ambiguity, the precision to which the returned code phase can be measured increases as the code period decreases. For example, if a precision of 10 nanoseconds is required and the code's period is 1 minute, then phase must be resolved to one part in $10^{10}$. This is a very difficult, if not impossible, task. However, if the code period is 2 microseconds, the same precision requires measurement to within only one part in 200.

The $\mu$-type system balances the conflicting requirements of ambiguity resolution and measurement precision through the use of several squarewave range codes. Related by powers of two, these codes are transmitted sequentially starting with the highest frequency, which establishes the precision of the measurement, and ending with the lowest which has minimum ambiguity. The preferred embodiment of the present invention makes available codes from about 8 MHz to approximately 1 Hz. This gives the system a maximum ambiguity resolution of $3 \times 10^8$ meters and a precision in the neighborhood of a fraction of a nanosecond.

The $\mu$-type system of the preferred embodiment is operated as part of a deep-space-network (DSN) tracking station. Its relation to other ground based subsystems and to a spacecraft is shown in FIG. 1. The system is comprised of a ground station exciter-transmitter 10, X- and S-band receivers 11, 12 and dual channel sequential ranging circuits 13. The X- and S-band receivers also employ doppler extractors 14, 15 to provide four doppler rate aiding signals X-DOP (0°, 90°) and S-DOP (0°, 90°). However, only the I.F. (10 MHz) signals from the X- and S-band receivers are utilized to obtain the improvement in the range data output of the present invention. A spacecraft transponder 16 receives range codes on an S-band carrier and returns range codes on X- and S-band carriers.

The ranging process starts with the generation of a range code in the ranging circuits 13. The range code is derived from a 66 or 132 MHz frequency reference by successive division by powers of two, and the frequency reference is produced by a stable generator 17. The range code is phase modulated onto the uplink carrier via modulator 18 and frequency multiplier 19, and transmitted to the spacecraft via a power amplifier 20 and an appropriate antenna. The transponder aboard a spacecraft is phase-locked to the uplink carrier. It multiplies the carrier frequency by 240/221 and 880/221 to develop, respectively, S- and X-band downlink carriers. Concurrently, the received range code is coherently detected, filtered in a 1 MHz pass-band channel and hard limited, all in a receiver 22, for demodulating the two down-link carriers in X- and S-band transmitters 23, 24.

The down-link X- and S-band signals are received by the receivers 11 and 12 which are phase-locked respectively to the X- and S-band carriers. These receivers provide the 10 MHz I.F. signals modulated with the range code to the ranging circuits 13 which independently measure the S- and X-band range. The ranging system shown thus has two separate and identical ranging channels, one for X-band, and one for S-band. Only the range measurement for the X-band channel will be described. It is to be understood that the description applies equally to the S-band channel, except for the frequencies involved.

The received range code phase differs from that transmitted due to RTLT and frequency change due to Earth-spacecraft relative doppler, as well as lesser phase and frequency variations due to the transmission medium. It is impossible to determine the phase difference of two squarewaves whose frequencies are not identical. Therefore, before range can be determined, the doppler effect must be removed. The preferred embodiment uses a second code, termed the receiver code, to accomplish this. In all respects this code is identical to the transmitted range code. The code is based upon the same 66 or 132 MHz reference used for the range code. Just prior to completion of a RTLT after start of the ranging sequence, the receiver code is synchronized to the transmitted range code, i.e., they are made identical. Following synchronization, however, the receiver code is modified by adding properly scaled doppler from the doppler extractor to the 66 or 132 MHz reference. This process, known as doppler rate aiding, causes the receiver code to instantaneously become a frequency coherent model of the received signal. In other words, it becomes identical to what the transmitted range code would be if the transmitted range code were modified by doppler. The necessary code phase measurement can now be made at leisure since the received range code and the receiver code remain in a fixed phase relationship. The resulting range determination is equivalent to the "backward looking" time of flight at the instant that the receiver code becomes rate-aided. This instant is called time TO. However, doppler rate aiding is not a part of the present invention; only a part of the preferred embodiment.

Figure 2:
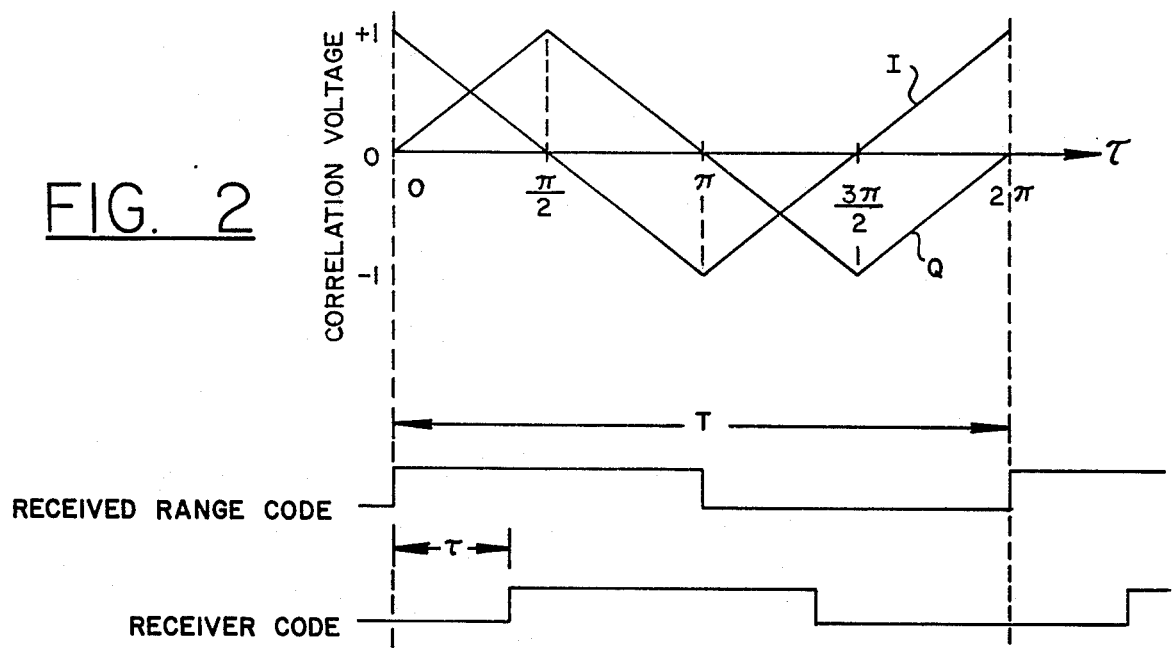
FIG. 2 illustrates in a graph the inphase, I, and quadrature, Q, correlation functions of two squarewave signals which may be the received range code compared with a receiver code in the system of FIG. 1 for ranging.

To mechanize the range code phase measurement, two correlation voltages are computed for each channel. The first voltage, called an inphase voltage, I, is a direct comparison of the received range code with the receiver code. The second voltage, called quadrature voltage, Q, is an analogous comparison of the received code with the receiver code delayed by one quarter of a code bit period. FIG. 2 shows how the inphase (I) and quadrature (Q) correlation voltages vary as a function of $\tau$, the phase difference. Given any values of I and Q, the following equations may be used to determine $\tau$ in microseconds.

$$0 \leq \phi_c < \frac{\pi}{2} \text{ given } I > 0, Q > 0 \quad (1)$$

$$\tau = \frac{T}{4} \left( \frac{Q}{I+Q} \right)$$

$$\frac{\pi}{2} \leq \phi_c < \pi \text{ given } I < 0, Q > 0 \quad (2)$$

Figure 3:
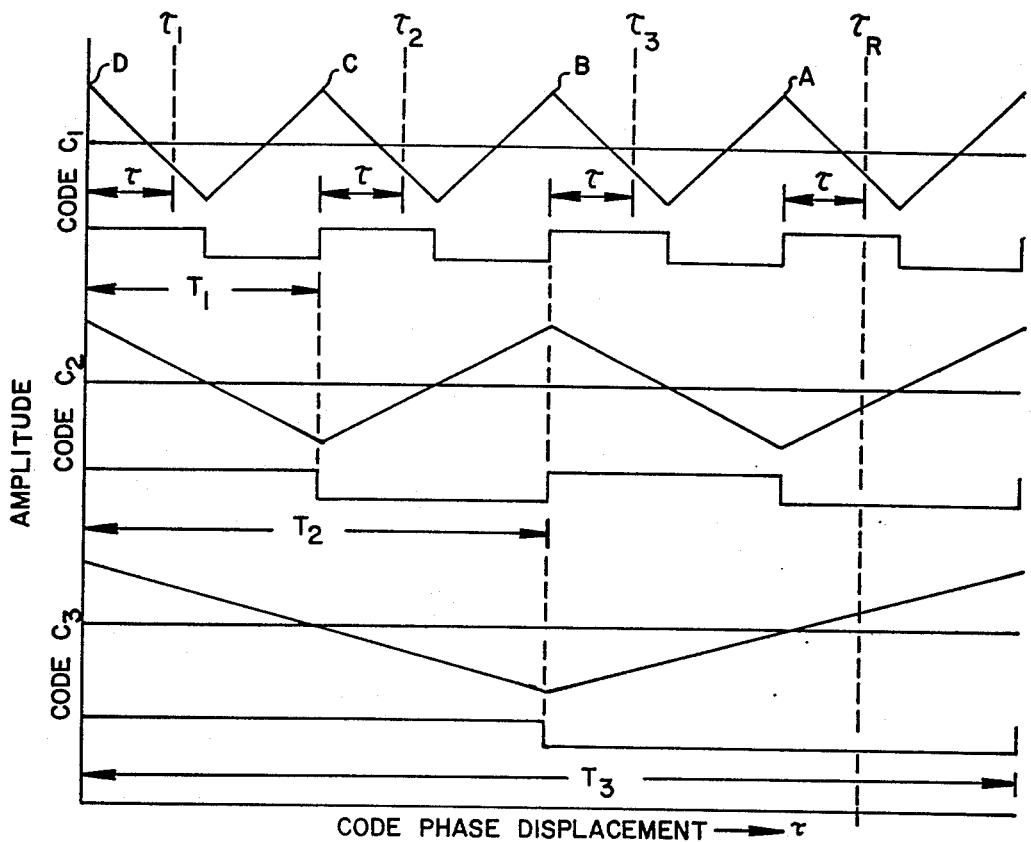
FIG. 3 illustrates inphase correlation functions for three successive codes in the sequential acquisition ranging system of FIG. 1.

-continued
$$\tau = \frac{T}{4}\left(\frac{I}{I-Q} + 1\right)$$

$$\pi \leq \phi_c < \frac{3\pi}{2} \text{ given } I < 0, Q < 0 \quad (3)$$

$$\tau = \frac{T}{4}\left(\frac{Q}{I+Q} + 2\right)$$

$$\frac{3\pi}{2} \leq \phi_c < \pi \text{ given } I > 0, Q < 0 \quad (4)$$

$$\tau = \frac{T}{4}\left(\frac{I}{I-Q} + 3\right)$$

Where $T = \frac{16 \times 2^N}{3 \times F_S}$,

N = code number (e.g., 1 for 4 MHz to 23 for 1 Hz),
$F_S$ = exciter synthesizer frequency (approximately 44 MHz) from which the 132 MHz reference is derived by multiplying by 3. The ranging circuits first determine the phase delay for the highest frequency code to establish the range measurement precision. The same determination on a series of lower frequency codes resolves the range ambiguity. Because each code is derived from the same binary counter, they are phase coherent. Therefore it is not necessary to actually measure the phase of any component except the first one. FIG. 3 shows the inphase correlation functions for three successive range components $C_1$, $C_2$ and $C_3$. (The quadrature function has been omitted for clarity.) Naturally, their respective correlation functions are coherent. Assuming that the original (highest frequency) component $C_1$ indicates a phase delay of $\tau$, the true (or least ambiguous) range point can be any of the points marked $\tau_i(i = 1 \ldots R)$. Putting the value $\tau$ into the range tally, and retarding the receiver code by the same amount, moves the observed point on the correlation function to a peak for the highest frequency code (one of the points labeled A, B, C, or D). Because the correlation functions are coherently related, the range code $C_2$ correlation function will now be at either a positive or negative peak. If the peak is positive, the component can be ignored since it is already in phase and makes no contribution to the range tally. If, on the other hand, it is negative then one half of the range code bit period is added to the range tally and once again, the receiver code is delayed by the same amount. This is illustrated by assuming the code $C_1$ measurement to be at $\tau_R$. The first retardation would leave the receiver code at A. The correlation function of code $C_2$ is negative; therefore the receiver code would be moved to point B after it is delayed by one half of the bit period of code $C_2$. Since the correlation function of the ranging code $C_3$ is negative at this point, one half of the bit period of code $C_3$ would be added to the tally and again the receiver code is delayed. This final shift leaves the receiver code at point D. The code phase delay is then determined to be equal to $\tau_R$. Note that while the first component must be explicitly measured, the succeeding component measurements consist only of determining the sign of the inphase correlation voltage.

So far, only ideal conditions have been discussed. In practice, charged particle plasmas, both ionospheric and interplanetary, corrupt the received signal. The range measurement is affected in two ways due to a plasma medium. First the range modulation is decreased in frequency (thereby corrupting code phase) and second the carrier is increased in frequency by a like amount (thereby corrupting doppler). This causes a slow drift of the measured phase delay. The measured drift, known as differential range versus integrated doppler (DRVID), can be used to determine the time rate of change of the total columnar electron content of the ray path. To both measure this drift and redetermine the initial phase measurement, the ranging program repeats the highest frequency component and remeasures its phase delay after the range acquisition is complete. Although these remeasurements can be performed at the correlation function peak, up to a 5 db improvement in performance is obtained by retarding the receive code by one eighth of the code period. Note from FIG. 2 that this is the "equal-power" point where both the quadrature and in phase voltages have equal magnitude. To further increase the amount of DRVID data, the highest frequency component is, at the operator's option, transmitted concurrently with all low frequency components, except the second, during the resolution of range ambiguity. DRVID data is then available throughout the ranging acquisition.

While the ranging algorithm has remained essentially unchanged, the present invention represents a marked advance and departure from earlier systems in the range code demodulation and correlation circuit. Whereas the circuit of earlier systems described in the aforesaid patent and other similar systems were purely analog, the circuit of the present invention is wholly digital. However, the departure is more extensive than that, as will be evident from the following general discussion of demodulation and correlation techniques, and a description of the demodulation and correlation circuit of the present invention in a preferred embodiment.

Figure 4:
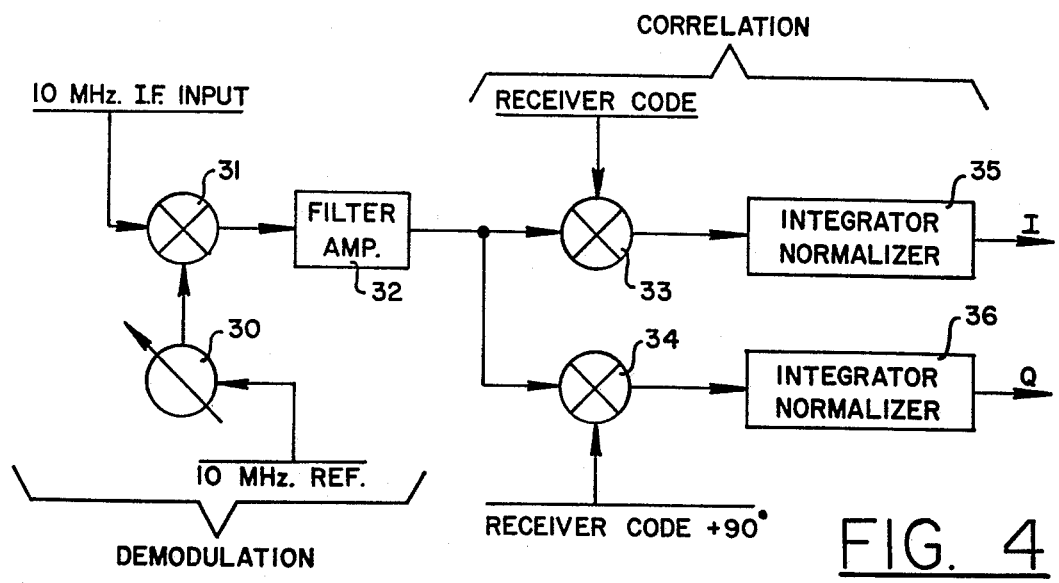
FIG. 4 illustrates the functional technique for comparing the received range code with a receiver code in the system of FIG. 1.

The process by which the returned range code is compared to the transmitted code is shown functionally in FIG. 4. A 10 MHz I.F. signal is obtained from the station receiver. To demodulate the range code, a 10 MHz reference is adjusted through a variable phase control unit 30 to quadrature with the I.F. carrier and both signals applied to a mixer 31. The mixer product after filtering and amplifying in a filter-amplifier 32, is the baseband squarewave code signal.

Two additional mixers 33, 34 are used to multiply the baseband squarewave with the receiver code and the receiver code delayed by 90°. If two squarewaves are allowed to take on the values ±1, and input to the mixer, the mixer output takes on the product values ±1 according to the following table:

| RECEIVED BASEBAND CODE | MIXED CODE | MIXER OUTPUT |
|---|---|---|
| −1 | −1 | +1 |
| −1 | +1 | −1 |
| +1 | −1 | −1 |
| +1 | +1 | +1 |

It is easy to visualize that if the phase difference between the two signals is 0°, then the output is always +1, but if it is 90°, the output is alternately +1 and −1, a squarewave with half the baseband code period. Given a phase difference of 180°, the output is always −1. For any other phase, the output is a pulse train whose ±1 duty cycle is proportional to the phase difference. Integration of the mixer outputs results in values related to the duty cycle and integration time. Normalizing the integrated values by their maximum yields the I and Q correlation functions in integrator normalizer 35 and integrator normalizer 36, respectively. Integration also averages the received random noise components in the I and Q functions. Demodulation and correlation of the range code is now complete.

Phase adjustment of the 10 MHz reference is crucial to best performance of the system. Any misadjustment degrades the values of the I and Q functions with respect to noise. Prior to ranging, this phase control is "calibrated" or so adjusted as to null the 10 MHz component in the first mixer output. This is the quadrature point required for phase demodulation. The corresponding carrier-phase calibration of the present invention is fully automatic, as will be described in the following discussion of FIG. 5.

Earlier sequential ranging equipment achieved cross correlation of received and local codes at 10 MHz using balanced mixers 33 and 34 shown in FIG. 4. Since the code had not been demodulated from the I.F. carrier, and the system bandwidths were relatively wide, small phase instabilities in the analog equipment did not affect the group delay. However, the system did require daily adjustment of the phase shifter 30 used to align the 10 MHz reference in quadrature to the receiver's I.F. carrier, and these adjustments were required to be made under strong signal conditions to prevent noise from obscuring the desired null. Thus, as the received signal became weaker, and the receiver AGC adjusted gain to compensate, phase shifts occurred rendering the previous phase adjustment improper. While the resultant losses were small, they nevertheless represented a system deficiency. Furthermore, phase adjustments were but once a day, so changes occurring throughout the day would not be detected until the following day. The present invention overcomes these and other problems as will become evident from the following description of FIG. 5.

Figure 5:
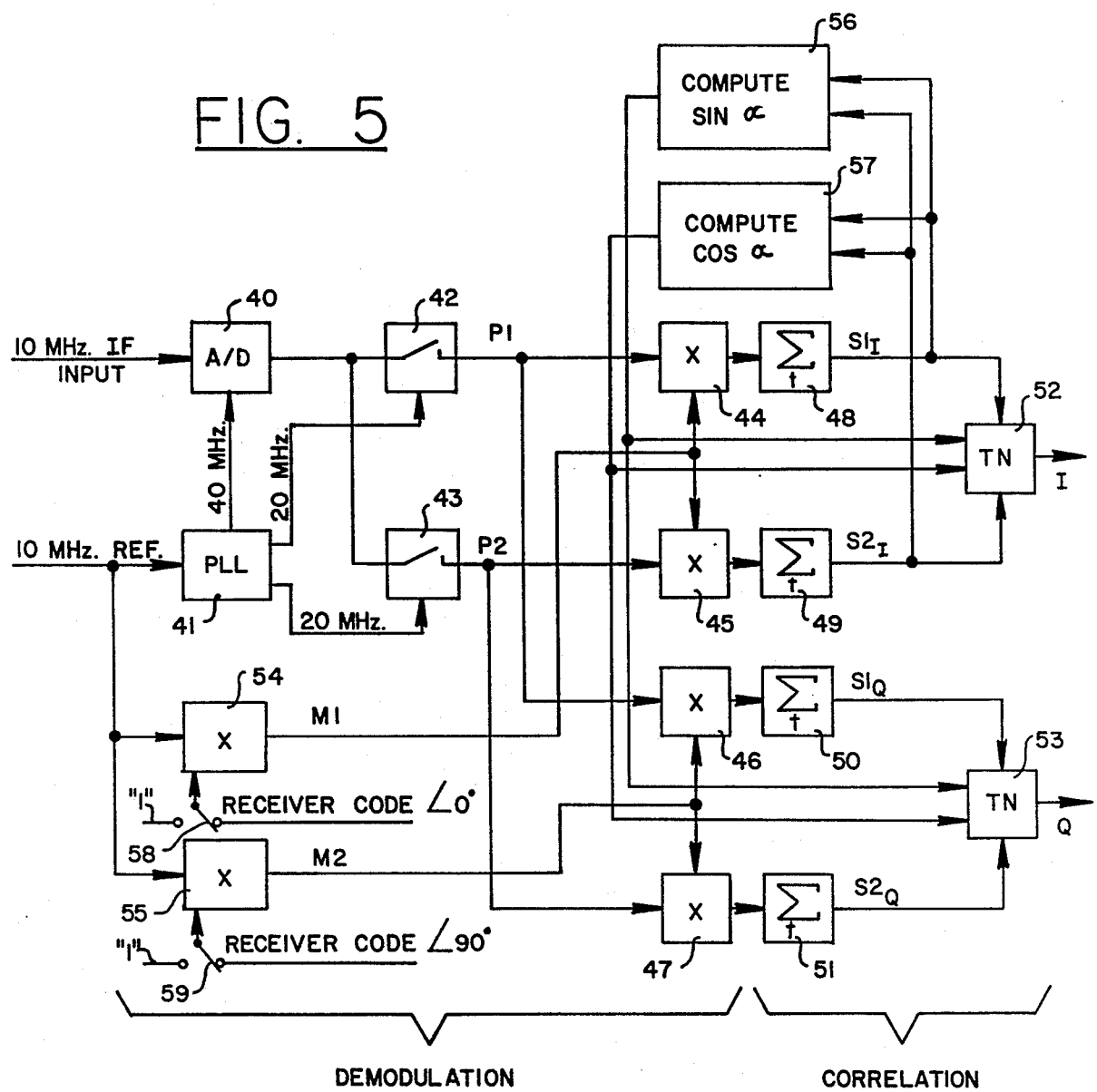
FIG. 5 illustrates in a functional block diagram the demodulation and correlation of the present invention.
Figure 6:
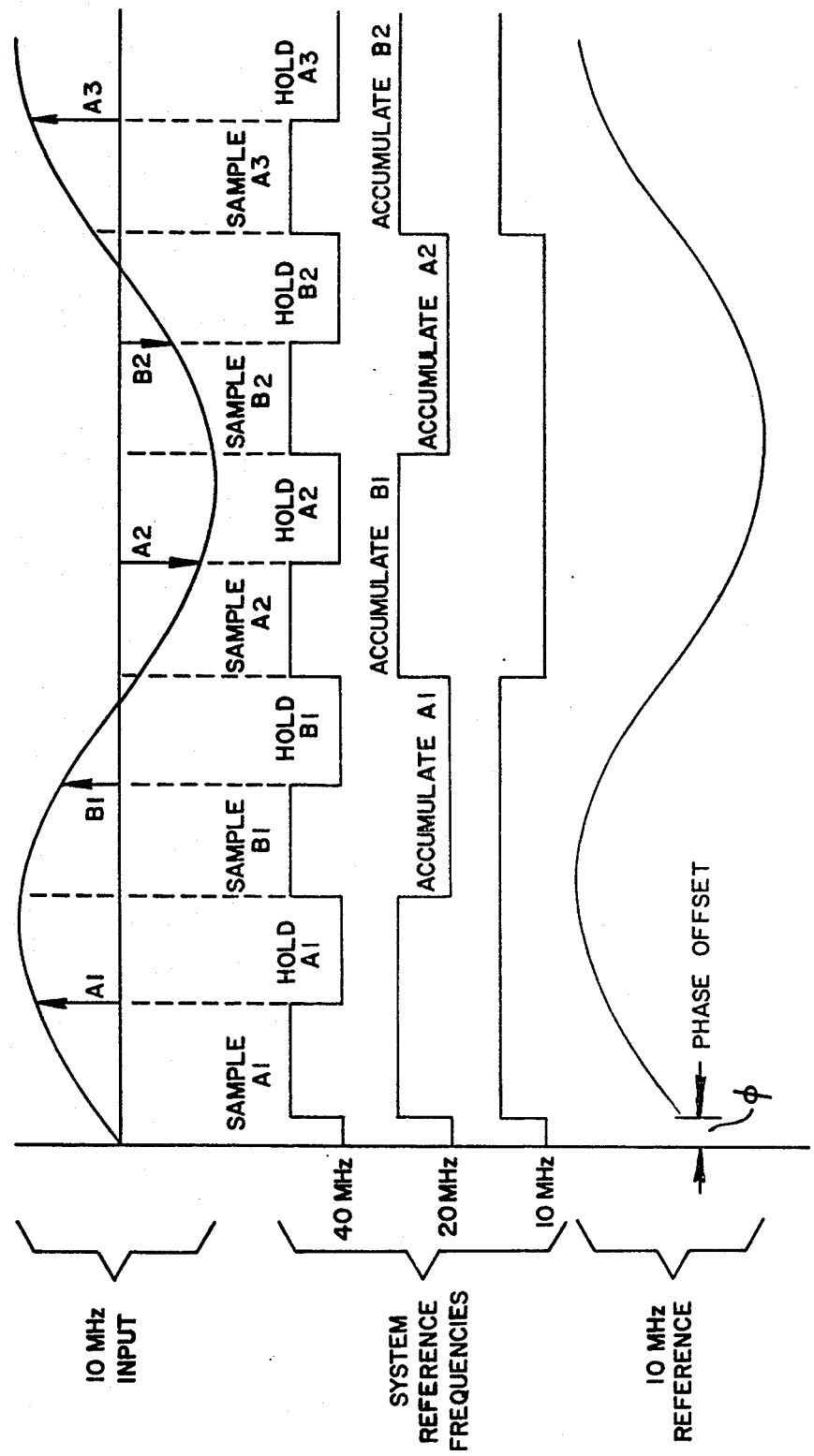
FIG. 6 is a sample timing diagram useful in understanding the present invention.

Referring now to FIG. 5, the demodulation and correlation of the range code is digital. Two advantages are realized over analog techniques, stability and fully automatic operation. The important distinction between this technique and that represented in FIG. 4 is that the incoming I.F. signal is immediately coherently sampled and digitized by an A/D converter 40. Discrete samples thereby created are processed to produce the same I and Q functions previously discussed with reference to FIG. 4, but in a distinct manner with greater accuracy, even with weaker signals. The samples are routed and controlled by 40 MHz, 20 MHz, and 10 MHz signals developed by a phase-locked loop (PLL) 41 synchronized to the 10 MHz reference of the base station. As shown in FIG. 6, the sample and hold periods of the A/D converter 40 is controlled by the 40 MHz signal. Four samples, A1, B1, A2, and B2 are taken for each cycle of the 10 MHz I.F. input. Samples A1 and A2 are routed to path P$_1$ by a switch circuit 42 under control of the 20 MHz signal. Similarly, B1 and B2 are routed to path P$_2$ by a switch circuit 43 under control of the complement 20 MHz of the 20 MHz signal.

FIG. 6 shows a phase offset, $\phi$, between the 10 MHz station reference and the 10 MHz I.F. input. Sample A1 is then taken at the point $\phi + \pi/4$. If $\phi + \pi/4$ is designated as $\alpha$, the following equations may be written for each of the samples (ignoring noise):

$$A1 = D \sin [\alpha + M(t)] \tag{5}$$

$$A2 = D \sin [\alpha + \pi + M(t)] \tag{6}$$

$$B1 = D \sin [\alpha + \pi/2 + M(t)] \tag{7}$$

$$B2 = D \sin [\alpha + 3\pi/2 + M(t)] \tag{8}$$

where:

D is the signal amplitude in digital form, and M(t) is the range code modulation $k \sin(\omega_x t)$ where $k$ is the modulation index.

Assuming that the multiplication terms M1 and M2 applied to multipliers 44 to 47 in FIG. 5 are in each case the 10 MHz squarewave signal from the phase-locked loop, the effect is to multiply samples A1 and B1 by 1 and samples A2 and B2 by $-1$. Under noise-free conditions, the outputs $S1_I$, $S2_I$, $S1_Q$ and $S2_Q$ of the discrete integrators 48 to 51, respectively contain the following values over a 10 MHz cycle:

$$S1'_I = S1'_Q = A1-A2 = 2D \sin(\alpha + M(t)) \tag{9}$$

$$S2'_I = S2'_Q = B1-B2 = 2D \cos(\alpha + M(t)) \tag{10}$$

where the primed terms designate the unprimed terms integrated over one 10 MHz cycle. The outputs, I and Q, are computed through transformation blocks 52 and 53 which are preferably implemented with software and are defined by:

$$I = S1_I \cos \alpha - S2_I \sin \alpha \tag{11}$$

$$Q = S1_Q \cos \alpha - S2_Q \sin \alpha \tag{12}$$

Simple trigonometry yields:

$$I' = Q' = 2D \, M(t) = 2Dk \sin [\omega_x t] \tag{13}$$

where the primed terms again designate the unprimed terms integrated over one 10 MHz cycle. From Equation (13) it should be apparent that the range code has been demodulated.

The remaining task is to correlate the demodulated range code against the output of the receiver coder. First allow the I' value given by Equation (13) to be integrated for time $t$ sufficiently large in integrator 52, as follows:

$$I = \sum_t I' = \sum_t 2 \cdot D \cdot k \cdot \sin [\omega_x t] \simeq 0 \tag{14}$$

For $t$ sufficiently large, $I = Q \simeq 0$. The next step is for the right side of Equation (14) to be multiplied in multiplier 44 by the $\pm 1$ squarewave $k \sin [\omega_x(t+\tau)]$. If $\tau = 0$, then I is equal to $$\sum_t 2 \cdot D \cdot k$$

If, however, $\tau$ is equal to $\frac{1}{4}$ of the code period, then $$I = \sum_t 2 \cdot D \cdot k \sin [\omega_x t] \sin [\omega_x t + \frac{\pi}{2}] \tag{15}$$

$$= \sum_t 2 \cdot d \cdot k \cdot \frac{1}{2} \sin [2\omega_x t] \simeq 0 \text{ for large } t.$$

If $\tau$ is equal to $\frac{1}{2}$ of the code period, $$I = \sum_t 2 \cdot D \cdot k \sin [\omega_x t] \sin [\omega_x t + \pi] \tag{16}$$

$$= \sum_t 2 \cdot D \cdot k \sin [\omega_x t] (-1) \sin [\omega_x t]$$

$$= -\sum_t 2 \cdot D \cdot k \text{ for large } t.$$

Observe that if the multiplying squarewave is the receiver code, then the values of the correlation curve I in FIG. 2 are obtained. The values of the correlation curve Q in FIG. 2 can be obtained in accordance with the present invention in a strictly analogous way in block 53.

To mechanize Equation (16), M1 is defined to be the 10 MHz squarewave reference times the receiver code. Similarly M2 becomes the reference multiplied by the receiver code delayed by $\frac{1}{4}$ of the code period. These products M1 and M2 are developed in blocks 54 and 55 which are mechanized very simply by exclusive-OR circuits. Equation (11) applied to $S1_I$ and $S2_I$ yields the inphase correlation values I while Equation (12) applied to $S1_Q$ and $S2_Q$ yields the quadrature correlation values Q. Both demodulation and correlation are now complete. However, one thing remains to be discussed: the determination of $\cos \alpha$ and $\sin \alpha$ for use in Equations (11) and (12). First, from Equations (9) and (10), if M1 and M2 are the 10 MHz reference:

$$S1_I = S1_Q = \sum_t 2D \sin(\alpha + M(t)) = 2D \sin \alpha, \text{ for large } t \quad (17)$$

$$S2_I = S2_Q = \sum_t 2D \cos(\alpha + M(t)) = 2D \cos \alpha, \text{ for large } t \quad (18)$$

From these equations $$\sin \alpha = \frac{S1_I}{\sqrt{S1_I^2 + S2_I^2}} = \frac{S1_Q}{\sqrt{S1_Q^2 + S2_Q^2}} \quad (19)$$

$$\cos \alpha = \frac{S2_I}{\sqrt{S1_I^2 + S2_I^2}} = \frac{S2_Q}{\sqrt{S1_Q^2 + S2_Q^2}} \quad (20)$$

The determination of $\sin \alpha$ and $\cos \alpha$ in blocks 56 and 57 is equivalent to "calibration" of the station reference previously done by adjustment of the 10 MHz reference to a null of the 10 MHz component in the first mixer output, but determination of $\sin \alpha$ and $\cos \alpha$ is done automatically under computer control at the start of each range acquisition by forcing the receiver code in multipliers M1 and M2 to be "1" via switches 58 and 59. The resulting S1 and S2 values are input to the blocks 56 and 57 where Equations (19) and (20) are mechanized, preferably by software. After "calibration", multipliers M1 and M2 are again selected to be the product of the receiver code and the 10 MHz reference.

It should be noted that noise-free signals were assumed throughout this discussion. Noise is, of course, part of any real signal. Since the sampling of the 10 MHz I.F. input is sufficiently fast to characterize the additive noise in this signal as well as the range-code signal, the digitally computed I and Q functions become a good representation of the inphase and quadrature range code correlation values which would be obtained from an ideal analog demodulator and correlator.

Figure 7:
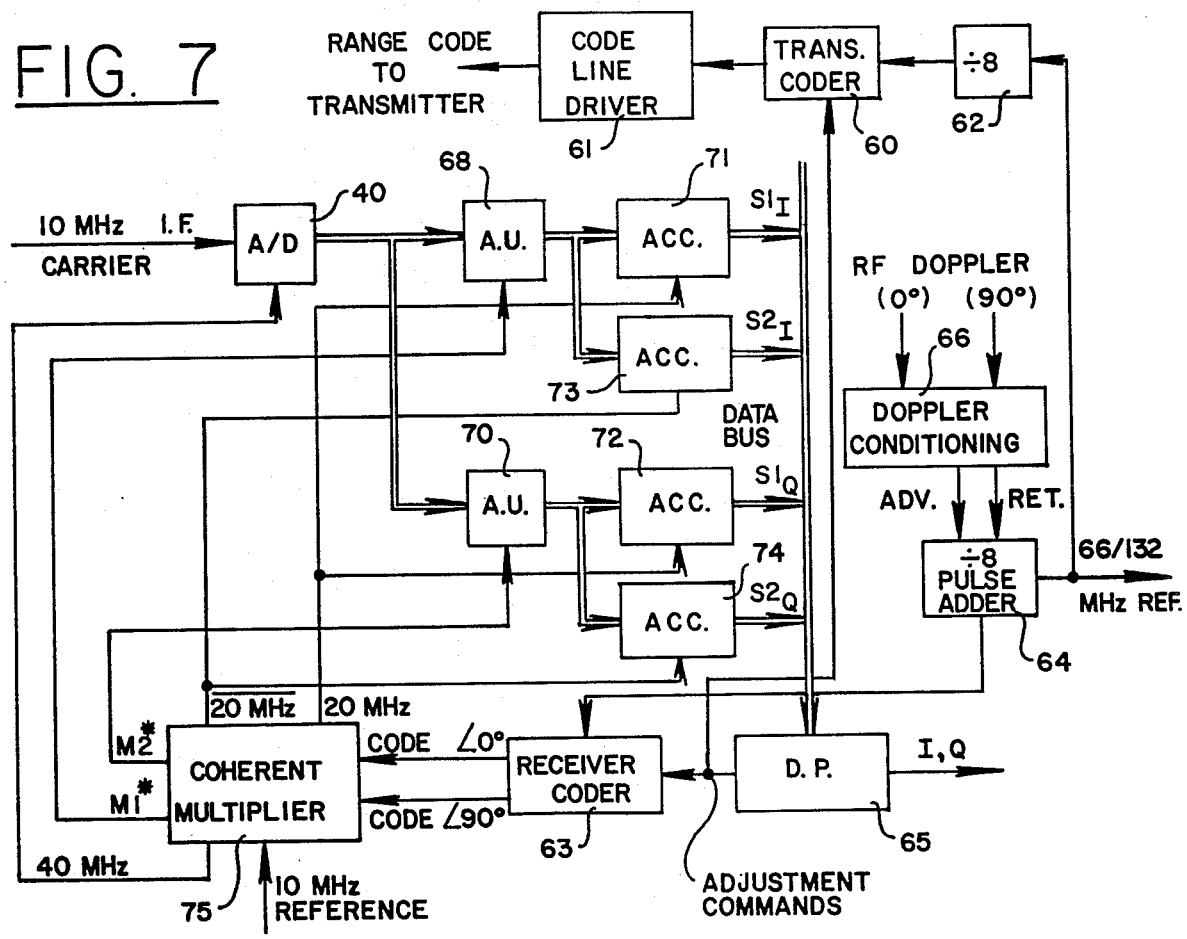
FIG. 7 is a block diagram of a preferred embodiment.

An exemplary implementation of the demodulator-correlator of FIG. 5 for one channel (the S-band channel) of the dual channel sequential ranging system 13 of FIG. 1 is shown in FIG. 7. The X-band channel is identical.

Since there is only one S-band uplink, only one transmitter coder 60 is required to generate the range code directed through a code line driver 61 to the phase modulator 18 of the transmitter 10 (FIG. 1). Code generation is accomplished by dividing the 66 or 132 MHz reference from the generator 17 (FIG. 1) by 8 in a divider 62 and applying the resultant 16.5 MHz frequency to a 24-stage binary counter in the coder 60. Provision is made for a 66 MHz reference to be used to maintain compatability with older DSN equipment. Reference will hereafter be made to only the 132 MHz reference to illustrate an exemplary embodiment.

As just noted, the coder 60 consists of 24 flip-flops arranged as a binary counter. Repeater flip-flops at the output resynchronize the code with 16.5 MHz from the divider 62 effectively tying the code to the 132 MHz reference, thus promoting stability.

A receiver coder 63 is preceded by a $\div 8$ pulse adder circuit 64. This circuit functions not only to reduce the 132 MHz to 16.5 MHz, but also to phase shift the receiver code. Independent divide by 8 counters provide separate control for receiver code relative to the transmitter code.

The output of the circuit 64 is used to adjust the phase of the receiver code with respect to the transmitter code. Adjustment commands may come from either a data processor (DP) 65 or from a doppler conditioning circuit 66 which receives doppler information from the doppler extractor 15. The circuit 64 effectively serves to delete a clock pulse in the retard (RTD) mode, or to delete a counter state, thus shortening the count sequence, in the advance (ADV) mode.

Because the 132 MHz reference is derived from the 44 MHz transmitter frequency synthesizer, the code is a subharmonic of the transmitted carrier. This relationship is a condition precedent to using the doppler extractor for rate aiding the receiver coder. However, because the link through the spacecraft involves frequency multiplication (240/221 for S-band; or 880/221 for X-band), the received doppler must be properly scaled before it can be used. Scaling is accomplished by applying the inverse multiplier and dividing until the doppler frequency has been reduced to one corresponding to the rate aiding frequency (132 MHz in this example). S-band scaling is accomplished by deleting 19 of every 240 doppler cycles providing the ratio 221/240. To be useful, the doppler frequency must be further reduced to that which would be found at the rate aiding frequency. Direction of spacecraft travel is determined by the phase relationship between the 0° and 90° doppler signals. In one case the 90° signal leads the reference whereas in the other it lags the reference.

The codes thus developed by the transmitter coder 60 and the receiver coder 63 are employed for the transmission of a range code on the S-band up-link and for correlation of the range code received on the S- or X-band (the S-band in the example of FIG. 7). At the S-band receiver 12 (FIG. 1) there is provided a single wideband amplifier with automatic gain control to provide a 10 MHz input signal to the A/D converter 40 (shown in both FIG. 5 and in FIG. 7).

Comparing FIG. 7 with FIG. 5, it is apparent that, in the exemplary implementation, the two channels (0° and 90°) are retained, and that code correlation is accomplished using high speed arithmetic units 68 and 70. Thereafter, numbers representing the degree of code correlation are collected in accumulators 71 to 74, and transferred at regular intervals to the data processor over a data bus. A coherent multiplier 75 performs all of the functions of the phase-locked loop 41 to produce a 40 MHz sampling command signal and a pair of complementary 20 MHz signals for alternating data through paired accumulators 71 and 72, and paired accumulators 73 and 74 corresponding to the respective paired accumulators 48 and 50, and paired accumulators 49 and 51 in FIG. 5. The coherent multiplier 75 also performs the analogous functions of the multipliers 54 and 55 in producing signals M1* and M2* according to the following logic functions:

M1* = CODE 0° ⊕ 10 MHz REF ⊕ CHOPPER,

M2* = CODE 90° ⊕ 10 MHz REF ⊕ CHOPPER, where CHOPPER is a low-frequency squarewave signal. Both the coherent multiplier and the receiver coder provide inputs to the arithmetic units 68 and 70. Since a completely digital demodulation scheme is employed, it is necessary to mix (exclusive-OR) the 10 MHz reference with the receiver code. Hence the first two terms in these logic functions M1* and M2*. The low-frequency chopper signal is included in these functions to foreclose contamination of the received signal by leakage from either the receiver coder or the 10 MHz reference.

Unlike earlier systems which had narrow band filters, the broadband character of this system might allow coupling of both code and/or 10 MHz reference through the power system into the AGC amplifier of the receiver. The result of such leakage is that the system might measure its own delay rather than the desired round trip distance to the spacecraft. The chopper signal prevents that.

The chopper signal is generated by the computer in accordance with a 10 ms station reference, and has a 50% duty cycle with a total period of 20 ms. The effect is to alternately cause the arithmetic unit to add and then subtract. Since the computer is generating the chopper signal, it knows the current status (i.e., inverted or non-inverted) and can decommutate the samples which are transferred from the accumulators at 10 ms intervals. The result is that any leakage occurring prior to the chopper is alternately added then subtracted, and hence is cancelled while the desired signal from the spacecraft is passed. Measurements indicate that the leakage is more than 60 db below the received carrier with the chopper operating.

Figure 8:
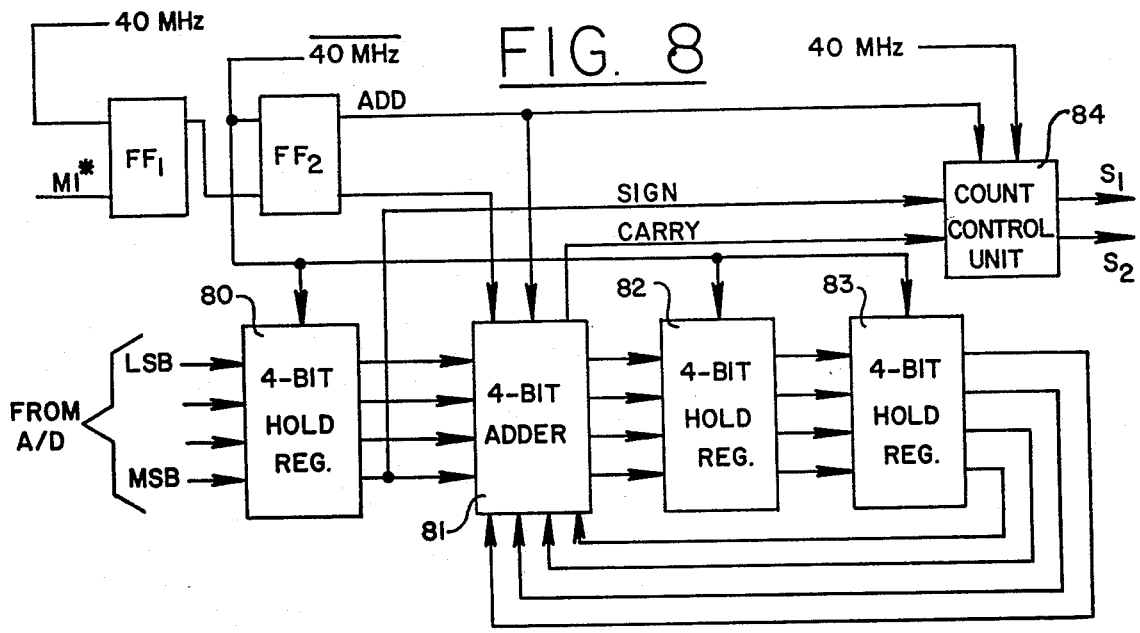
FIG. 8 illustrates the organization of an arithmetic unit in the preferred embodiment of FIG. 7.

FIG. 8 illustrates an exemplary implementation of the arithmetic unit 68. The other arithmetic unit is identical.

Synchronization and delay flip-flops $FF_1$ and $FF_2$ are included to align the coder and chopper sample times with those of the A/D converter which is sampling the receiver's I.F. carrier. The 4 bits from the A/D converter are simultaneously strobed into a hold register 80 which provides inputs to a 4-bit adder 81. During the next sample time, these will either add the new sample to or subtract it from previous values accumulated in output registers 82 and 83. At the conclusion of the add-subtract cycle, the result is transferred to the first of the two output registers.

Two registers are required to implement the alternate sampling. Assuming an initial condition wherein the registers are cleared, the first sample, A1, is added or subtracted into the first output register. Thereafter, the second sample, B1, is likewise transferred to the first output register while sample A1 is shifted to the second register. Note that A1 is now available at the second input to the adder. Thus, when sample A2 is taken, it can be combined with sample A1 and stored in the first register while sample B1 is shifted to the second register. This process continues such that one register contains $$\sum_{i=i}^{n} Ai$$

while the other holds $$\sum_{i=i}^{n} Bi.$$

Since the two output registers contain only 4 bits and the samples are collected at a 40 MHz rate, additional storage is required. The accumulators 71–74 (FIG. 7) each consist of 20 stage up-down counters. When the arithmetic operation results in a carry from the least significant 4 bits, an appropriate count command is generated and supplied to the proper accumulator. Three possible alternatives exist. The accumulator may add to, subtract from, or retain its present value. This decision depends upon the adders carry output, the sign of the present sample, and the status of the adder 81 (add or subtract) as determined by the flip-flop $FF_2$. Two control bits $S_1$ and $S_2$ are generated by count control unit 84 and used to select the count mode of the accumulator 71, for example, according to the following table

| $S_1$ | $S_2$ | MODE |
|---|---|---|
| 0 | 0 | Hold (stop count) |
| 0 | 1 | Increment (count up) |
| 1 | 0 | Decrement (count down) |
| 1 | 1 | Hold (stop count) |

The logic of the count control unit 84 can be expressed as $$S_1 = \overline{CARRY}$$

$$S_2 = \overline{Add} \cdot SIGN + Add \cdot \overline{SIGN}$$

Similar control bits are generated for the accumulator 73. The control bits for both the accumulators are stored for one 40 MHz clock period in the count control unit 84. During the subsequent clock cycle they are used to retain or change the contents of the accumulators.

From the foregoing discussion regarding the arithmetic unit shown in FIG. 8, it is evident that, although sampling is at a 40 MHz rate, the collection of $$\sum_{i=i}^{n} Ai$$

and $$\sum_{i=i}^{n} Bi$$

proceeds at one half that speed. Reference to the 20 MHz and 40 MHz waveforms on FIG. 6 will clarify the operation. Note that samples are taken during the positive portion of the 40 MHz period and held while in the negative part. The arithmetic operation takes place during this negative period with the result stable and ready to be used by the following positive transition. Since $$\sum_{i=o}^{n} Ai \text{ and } \sum_{i=o}^{n} Bi$$

must be separate in order to compute the 10 MHz I.F. carrier's phase, it is necessary to provide two accumulators. The 20 MHz clock can be used to steer the data to the proper accumulator as shown in FIG. 7. During the negative half cycle data is guided to accumulator A and the positive half cycle data is guided to accumulator B. However, the above explanation is only illustrative of the principal of operation. The existence of a register in the count control unit 82 (FIG. 8) has the effect of delaying accumulation by an additional 40 MHz clock period (the clock period of the flip-flops $FF_1$ and $FF_2$). Such a register provides insurance against timing problems which can occur when data is transferred from the arithmetic unit to the accumulators.

Returning to the diagram of FIG. 7, it can be seen that accumulator B receives the 20 MHz clock whereas the complement, $\overline{20 \text{ MHz}}$, is directed to accumulator A. The data is thus steered to A or B depending upon the clock's phase. Note also that because these clocks are derived from a phase-locked loop, wherein a definite and certain phase relationship exists between all clocks and the 10 MHz reference, it is impossible for the samples to be directed to the improper accumulator.

Data is accumulated continuously in the accumulators. At 10 ms intervals the computer issues a register transfer command causing the most significant 16 bits of the counter to be transferred to a hold register for input to the computer. Only 16 rather than all 20 bits are transferred since they provide adequate precision and facilitate data transfer to a 16-bit computer, such as the Digital Equipment Corporation PDP-11/20.

Accumulator contents are transferred to the hold registers simultaneously for all channels at the conclusion of a 10 MHz cycle. Referring to FIG. 6, this means that contents of Register A is transferred following sample A2n, and that of Register B is transferred following sample B2n where the sample number, n, will be the same for both transfers. This amounts to simultaneous sampling and forecloses errors due to nonuniform sample intervals or samples representing partial cycles.

Corresponding bits from all hold registers are bussed in common for transfer to the computer. Individual gate controls on the hold registers allow sequential transfer of data from a hold register into the computer via the data bus. Numerical data accumulated in these hold registers represent the degree of correlation between the received ranging code and the receiver codes. Using this information the phase of the received ranging code, and hence the range, can be computed in the computer.

Although particular embodiments of the invention have been illustrated and described herein, it is recognized that modifications and variations may readily occur to those skilled in the art, and that the basic concept of the invention may be practiced in still other applications. For example, in telemetry of analog data from a remote station, such as an oil field, to a central station, the central station may transmit a reading code to a transponder which returns the reading code after a delay proportional to the amplitude of an analog signal from a transducer. The central station may demodulate and correlate the reading code to determine the delay, and thus determine the value of the analog signal with a high degree of accuracy. For more than one transducer, the transponder may return a number of reading codes on carriers of different frequencies, one for each transducer. Consequently, it is intended that the claims cover such modifications and variations.

What is claimed is:

1. Apparatus for demodulation of a code modulated signal having a predetermined frequency and for correlation of the demodulated signal with a reference code, comprising means for sampling said code modulated signal at a frequency four times said predetermined frequency and for converting each sample to digital form, thereby to produce four equally spaced successive samples A1, B1, A2 and B2 in digital form for each cycle of said modulated signal, four separate means for accumulating multiplication products of M1 and M2 with said samples in digital form thereby to produce four sums according to the following equations:

$$S1_I = \sum_t (A1 - A2) M1 \quad S1_Q = \sum_t (A1 - A2) M2$$

$$S2_I = \sum_t (B1 - B2) M1 \quad S2_Q = \sum_t (B1 - B2) M2$$

where M1 is a reference signal at said predetermined frequency multiplied by said reference code, and M2 is said reference signal multiplied by said reference code delayed one quarter of a cycle, means for computing inphase and quadrature correlation functions I and Q, respectively, from said sums in accordance with the following equations:

$$I = S1_I \cos \alpha - S2_I \sin \alpha$$

$$Q = S1_Q \cos \alpha - S2_Q \sin \alpha$$

where $\sin \alpha$ and $\cos \alpha$ are determined at the start of demodulation operations according to the following equations:

$$\sin \alpha = \frac{S1_I}{\sqrt{S1_I^2 + S2_I^2}}, \cos \alpha = \frac{S2_I}{\sqrt{S1_I^2 + S2_I^2}}$$

while both multipliers M1 and M2 are made to be equal to said reference signal, and means for making both multipliers M1 and M2 equal to said reference by setting said reference code and said reference code delayed one quarter of a cycle equal to 1 at the start of demodulation and correlation operations while $\sin \alpha$ and $\cos \alpha$ are being determined.

2. Apparatus as defined in claim 1 wherein said means for sampling said code modulated signal is comprised of means for multiplying said reference signal by four and means responsive to the resulting higher frequency signal for timing the samples so that said four equally spaced samples all occur at the same phases on successive cycles of the code modulated signal.

3. Apparatus as defined in claim 2 wherein said four separate means for accumulating samples in digital form are synchronized by a timing signal at half the frequency of said higher frequency signal, and means responsive to said timing signal for routing samples A1 and A2 to both means for accumulating the sums $S1_I$ and $S1_Q$, and means responsive to the complement of said timing signal for routing samples B1 and B2 to both means for accumulating the sums $S2_I$ and $S2_Q$.

4. Apparatus as defined in claim 3 wherein said timing signal, and its complement, and said higher frequency signal, are coherently produced by said frequency multiplying means from said reference signal to maintain phase coherence of all sampling and accumulating operations with respect to said four samples of each cycle of said code modulated signal.

5. Apparatus for demodulation of a code modulated signal having a predetermined frequency, and for correlation of the demodulated signal with a reference code, comprising
   means for sampling said code modulated signal at a frequency four times said predetermined frequency in response to a sampling control signal, said sampling means including means for converting each sample to digital form,
   means responsive to a reference signal at said predetermined frequency for producing said sampling control signal so that four equally spaced samples A1, B1, A2 and B2 all occur at the same phases of successive cycles of said code modulated signal, and
   means for accumulating multiplication products of M1 and M2 with said samples in digital form in two pairs to form the difference of samples A1 and A2, and the difference of samples B1 and B2 in each of two channels by adding or subtracting each successive sample in accordance with a first multiplier M1 comprised of the product of a reference code and a squarewave signal at said predetermined frequency, and a second multiplier M2 comprised of the product of said reference code delayed one quarter of a cycle of said squarewave signal to form four sums according to the following equations:

$$S1_I = \sum_t (A1 - A2) M1 \quad S1_Q = \sum_t (A1 - A2) M2$$
$$S2_I = \sum_t (B1 - B2) M1 \quad S2_Q = \sum_t (B1 - B2) M2$$

and means for computing inphase and quadrature correlation functions I and Q, respectively, from said sums in accordance with the following equations:

$$I = S1_I \cos \alpha - S2_I \sin \alpha$$
$$Q = S1_Q \cos \alpha - S2_Q \sin \alpha$$

where $\sin \alpha$ and $\cos \alpha$ are determined at the start of demodulation and correlation operations according to the following equations:

$$\sin \alpha = \frac{S1_I}{\sqrt{S1_I^2 + S2_I^2}}, \cos \alpha = \frac{S2_I}{\sqrt{S1_I^2 + S2_I^2}}$$

while said reference code and said reference code delayed are both set equal to one.

6. Apparatus as defined in claim 5 wherein each of said first and second multipliers are further comprised of a squarewave chopper signal of low frequency such that each chopper cycle spans a number of cycles of said code modulated signal.

7. Apparatus for demodulation and correlation of a binary code modulated signal with a reference binary code, said signal being at a predetermined frequency greater than the pulse rate of said binary code, comprising
   means for sampling said code modulated signal at four equally spaced intervals of each cycle of said code modulated signal, and for converting each sample to digital form, whereby four samples A1, B1, A2 and B2 in digital form are obtained at the same phases of said code modulated signal during successive cycles,
   means for accumulating products of M1 and M2 with said samples to form four separate sums $S1_I$, $S2_I$, $S1_Q$ and $S2_Q$ according to the following equations:

$$S1_I = \sum_t (A1 - A2) M1 \quad S1_Q = \sum_t (A1 - A2) M2$$
$$S2_I = \sum_t (B1 - B2) M1 \quad S2_Q = \sum_t (B1 - B2) M2$$

where M1 is the product of a reference signal at the same frequency as said code modulated signal and said reference code, and M2 is the product of said reference signal and of said reference code delayed one quarter of a cycle of said reference signal, and
   means for computing inphase and quadrature correlation functions I and Q in accordance with the following equations:

$$I = S1_I \cos \alpha - S2_I \sin \alpha$$
$$Q = S1_Q \cos \alpha - S2_Q \sin \alpha$$

where $\sin \alpha$ and $\cos \alpha$ are determined in advance by forcing said reference code to 1 for both multipliers M1 and M2 while producing said sums and computing $$\sin \alpha = \frac{S1_I}{\sqrt{S1_I^2 + S2_I^2}}, \cos \alpha = \frac{S2_I}{\sqrt{S1_I^2 + S2_I^2}}.$$

8. Apparatus as defined in claim 7 wherein each of said multipliers M1 and M2 is a product of a squarewave chopper signal in addition to said reference signal and said reference code, and said chopper is of a low frequency so that each cycle spans a number of cycles of said reference code.

9. Apparatus as defined in claim 7 wherein said means for sampling said code modulated signal is comprised of means for multiplying said reference signal by four and means responsive to the resulting higher frequency signal for timing the samples so that said four equally spaced samples occur at the same phases on successive cycles of the code modulated signal.

10. Apparatus as defined in claim 9 wherein said means for accumulating products is synchronized by a timing signal at half the frequency of said higher frequency signal, and means responsive to said timing signal for routing samples A1 and A2 to form the separate sums $S1_I$ and $S1_Q$, and means responsive to the complement of said timing signal for routing samples B1 and B2 to form the separate sums $S2_I$ and $S2_Q$.

11. Apparatus as defined in claim 10 wherein said timing signal, and its complement, and said higher frequency signal, are coherently produced by said frequency multiplying means from said reference signal to maintain phase coherence of all sampling and accumulating operations with respect to said four samples of each cycle of said code modulated signal.

12. Apparatus as defined in claim 11 wherein said means for accumulating products is comprised of two arithmetic units and four accumulators, one arithmetic unit for both sums $S1_I$ and $S2_I$ under control of said multiplier M1 and one arithmetic unit for both sums $S1_Q$ and $S2_Q$ under control of said multiplier M2 with routing of each sample to be added or subtracted to each of two paired sums $S1_I$ and $S1_Q$ under control of timing signal and to each of two paired sums $S2_I$ and $S2_Q$ under control of the complement of said timing signal.

* * * * *